(No Model.)
F. D. WILT.
BALL BEARING.
No. 601,298. Patented Mar. 29, 1898.
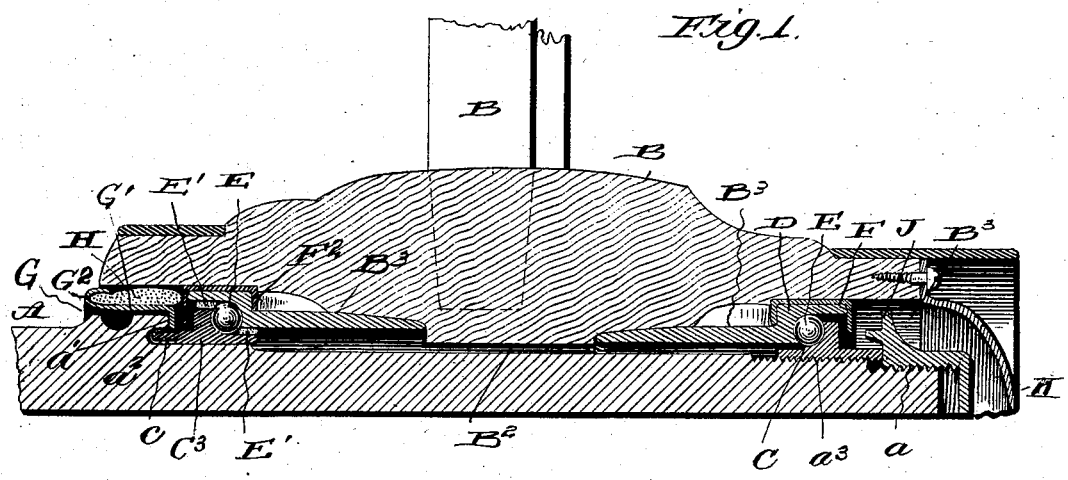
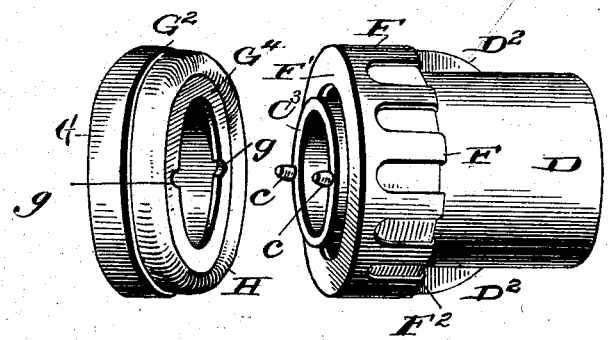
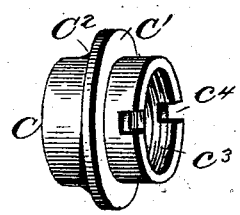
Witnesses:
L. C. Hills.
Alfred T. Gage.
Inventor:
Frank D. Wilt,
by E. B. Stockling
Attorney.

UNITED STATES PATENT OFFICE.

FRANK D. WILT, OF ALLENTOWN, PENNSYLVANIA.

BALL-BEARING.

SPECIFICATION forming part of Letters Patent No. 601,298, dated March 29, 1898.

Application filed June 26, 1897. Serial No. 642,488. (No model.)

*To all whom it may concern:*

Be it known that I, FRANK D. WILT, a citizen of the United States, residing at Allentown, in the county of Lehigh, State of Pennsylvania, have invented certain new and useful Improvements in Ball-Bearings, of which the following is a specification, reference being had therein to the accompanying drawings.

This invention relates to ball-bearings adapted for application to vehicles and various classes of machinery.

The invention has for its object to provide a novel construction of cone and cup, together with means for securing the same together, so that they may be removed or replaced without danger of the balls falling out of position.

It has for a further object to provide improved means for securing the bearing upon the axle-spindle and also to provide an improved construction of dust-cap by means of which dirt and dust will be excluded from the bearing.

Other objects and advantages of the invention will hereinafter appear and the novel features thereof will be particularly pointed out in the appended claims.

In the drawings, Figure 1 is a partial central vertical section illustrating a form of the invention. Fig. 2 is a detail perspective of the dust-cap. Fig. 3 is a similar view of the assembled bearing, and Fig. 4 is a perspective of the cup used at the outer end of the spindle.

Like letters of reference indicate like parts throughout the several figures of the drawings.

The letter A represents an axle-spindle such as is ordinarily used and which is provided at its outer end with a screw-threaded portion $a$ and at a distance inward therefrom with a shoulder $a'$. In connection with this spindle I have illustrated a vehicle-hub B, provided with the usual spokes B', which rotates on the spindle and is provided with a central aperture $B^2$, through which the spindle passes. While this form of spindle and hub has been illustrated, it may be stated that the invention is intended to be applied to any form of rotatable bearing whether used in a vehicle or otherwise.

The bearing proper consists of the cup C, adapted to be rigidly secured to the spindle, and the cone D to be carried by a rotating part, between which cup and cone the bearing-balls E are located. The cup C has provided thereon a peripheral flange C' and a concave raceway $C^2$. This outer cup is formed with its inner surface of slightly greater diameter than the diameter of the spindle and is secured upon the spindle by means hereinafter described. The cone D is provided at its outer enlarged portion with a raceway D', concave in cross-section, and upon the outer periphery of the inner portion of the cone splines $D^2$ are formed, which will enter the wood of the hub, and thus hold the cone against rotation. The relation of the raceways upon the cup and cone is such as to afford a bearing against endwise movement of the hub as well as the vertical pressure thereon. When the parts of the bearing are assembled, the cup passes within the enlarged end of the cone, so as to bring the raceways and balls in their relation, and a retaining-cap F is then placed over the outer end of the cone to prevent the removal of the cup. This cap is provided with an inturned flange F' and with a series of separate projecting prongs $F^2$, which are adapted to be turned down over the enlarged portion of the cone, so as to retain the cap in position. This form of bearing is inserted in enlarged recesses $B^3$, formed in each end of the hub, and the cone secured in place by means of the splines $D^2$, engaging the material of the hub.

At the inner end of the spindle, Fig. 1, a dust-cap G is located, which is composed of an annular portion G', having an overturned edge $G^2$, which is adapted to engage and hold in position a packing H, formed of felt or other suitable material, which may be saturated with a lubricant, if so desired. The dust-cap has also an annular flange $G^4$, provided with recesses $g$, which lies against the shoulder $a'$ on the spindle. As shown in Fig. 1, it is evident that the packing H will bear against the retaining-cap F, and thus prevent the entrance of any dust or dirt to the parts of the bearing.

The cup $C^3$ is similar to cup C and forms part of the inner bearing, while the outer end of the cup is provided with projecting pins $c$, which are adapted to engage with correspondingly-located recesses or sockets $a^2$, formed in the shoulder $a'$ of the spindle A. At opposite sides of the raceways and between the cup and cone I locate the packing-washers $E'$, which may be of felt or any suitable material and saturated with oil to lubricate the balls E and to prevent the entrance of dust or any substances into the bearing. The dust-cap G has the flange $G^4$, provided with recesses $g$, as described, and the pins $c$ pass through the recesses $g$ and into the sockets $a^2$, so that the several parts are thus held against rotation.

The cup C of the outer bearing is provided with a threaded aperture $c^3$, and the outer end of the spindle is provided with supplemental threads $a^3$, upon which the cup may be adjusted, and when adjusted will be held in position by means of the threaded cap J, which engages the threads $a$ and acts as a jam-nut when brought into contact with the cup. The cup is provided upon its outer end with oppositely-located recesses $c^4$, with which a wrench or other suitable tool may be engaged for the purpose of rotating the cup to adjust the same upon the spindle.

The outer end of the hub is provided with a suitable dust-cap K to exclude dust or foreign matter from the parts of the bearing. The retaining-cap F holds the parts of the bearing together, so that they can be removed and replaced without danger of loss of the balls, and the particular construction of dust-cap supports the packing in such a position as to secure a tight joint between the several parts.

It is obvious that changes may be made in the details of construction of the several parts of the bearing without departing from the spirit of the invention as defined in the appended claims.

Having described my invention and set forth its merits, what I claim as new, and desire to secure by Letters Patent, is—

1. A ball-bearing comprising a cone member, a cup extending within the same, balls between said cup and cone, and a flexible cap having a retaining-flange and a horizontal portion adapted to be bent over said cone, substantially as specified.

2. A ball-bearing comprising a cone member, a cup member extending within the same, bearing-balls located between said cup and cone, and a retaining-cap provided with a flange to prevent withdrawal of the cup from the cone and with prongs to secure the cap upon the cone, substantially as specified.

3. A ball-bearing comprising a cone having an enlarged outer end and provided with splines upon its inner portion, a cup fitting within said cone and provided with a peripheral flange, bearing-balls located between said cup and cone, and a retaining-cap provided with a flange overlapping said peripheral flange upon the cup and with prongs to retain the cap upon the cone, substantially as specified.

4. The combination with a spindle and the rotatable member thereon, of a dust-cap provided with a horizontal portion held against rotation upon said spindle and having an overturned edge to extend over and hold the packing material upon said horizontal portion, substantially as specified.

5. A dust-cap for vehicles composed of an annular portion $G'$, a peripheral packing H, and an overturned edge $G^2$ from said annular portion to engage and hold said packing, substantially as specified.

6. The combination with a spindle provided with sockets therein, of a bearing-cup having projecting pins thereon, a dust-cap provided with packing material, an annular flange on said cap with recesses therein to lie between said cup and spindle and receive said pins, a bearing-cone surrounding said cup, and balls located between said cup and cone substantially as specified.

7. The combination with a spindle, of a bearing-cup secured thereon against rotation, a cone carried by a rotatable member, bearing-balls located between said cup and cone, a retaining-cap carried by said cone to prevent the withdrawal of said cup, a dust-cap upon the inner end of said spindle, and a nut threaded upon the outer end of said spindle, substantially as specified.

8. The combination with a spindle having sockets therein, of a bearing-cup provided with projecting portions adapted to seat in said sockets, a bearing-cone carried by a rotatable member, and balls located between said cup and cone, substantially as specified.

9. The combination with a spindle, of a bearing-cup and a bearing-cone, balls located between said cup and cone, a dust-cap, and means located below the acting surface of the cup for retaining the said dust-cap and bearing-cup against rotation, substantially as specified.

10. The combination with a spindle having sockets therein, a dust-cap having recesses therein, a bearing-cup provided with projections extended into the recesses in said cup and into said sockets, a bearing-cone carried by a rotatable member, and balls located between said cup and cone, substantially as specified.

11. The combination with a spindle, of a bearing-cup fixed thereon, a bearing-cone coincident with said cup, balls between said cup and cone, a retaining-cap on said cone having a flange to prevent withdrawal of the cup and packing-strips between said cup and cone at the sides of said balls, substantially as specified.

In testimony whereof I affix my signature in presence of two witnesses.

FRANK D. WILT.

Witnesses:
LEVI F. GRUBER,
EMERSON F. SCHOCK.